Oct. 26, 1971  J. A. RUST  3,615,003
FOOD CONVEYOR SYSTEM FOR A VEHICLE
Filed May 1, 1969  2 Sheets-Sheet 1
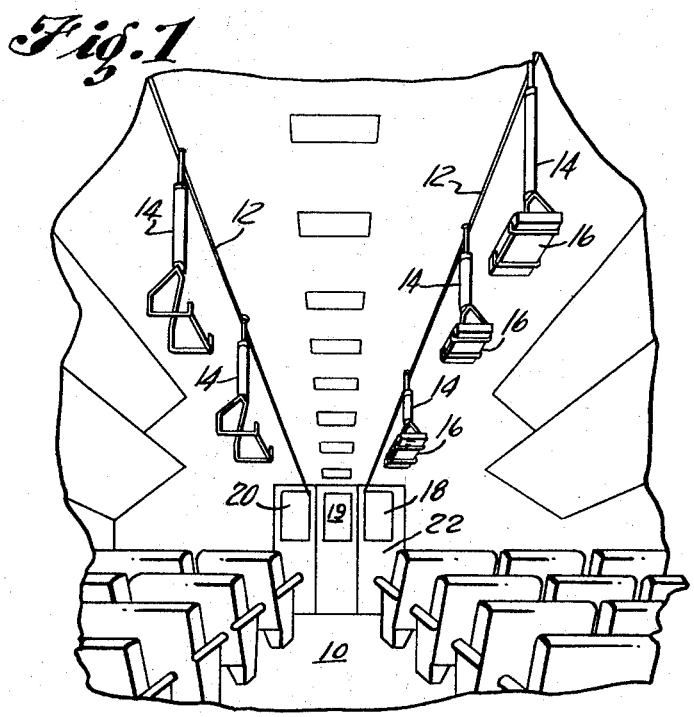
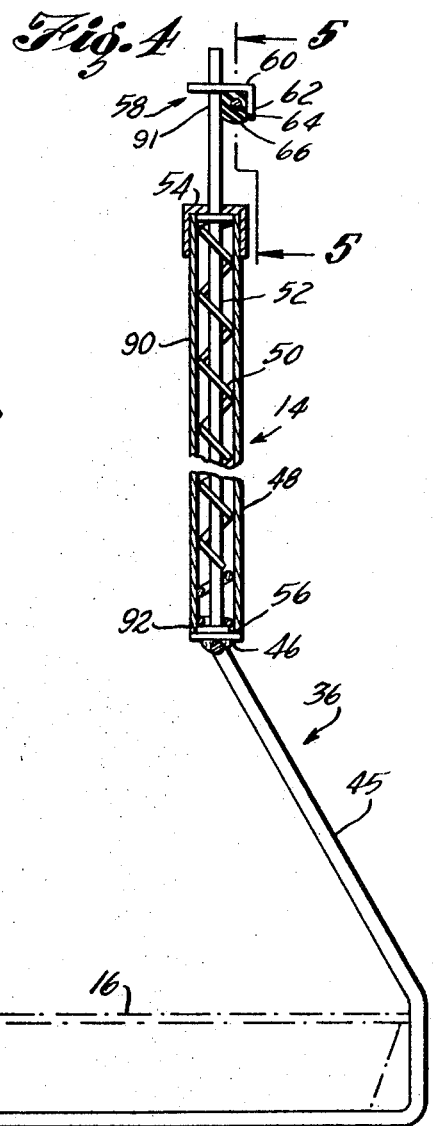
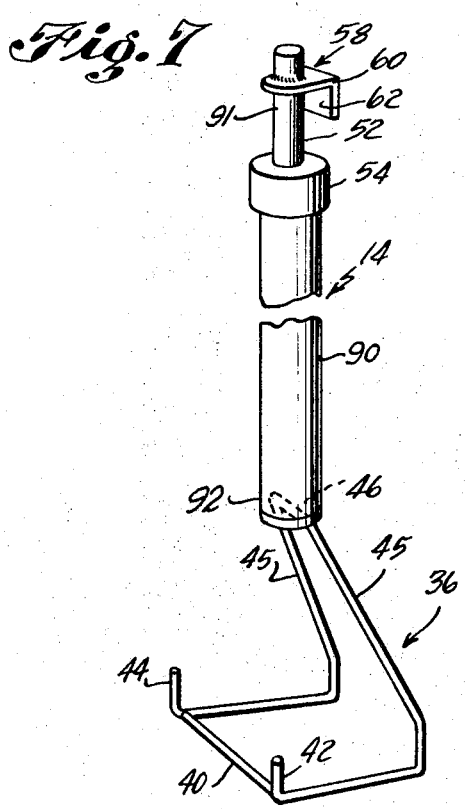
Jacob A. Rust
INVENTOR.
BY Roger L. Martin
Attorney Oct. 26, 1971 — J. A. RUST — 3,615,003
FOOD CONVEYOR SYSTEM FOR A VEHICLE
Filed May 1, 1969 — 2 Sheets-Sheet 2
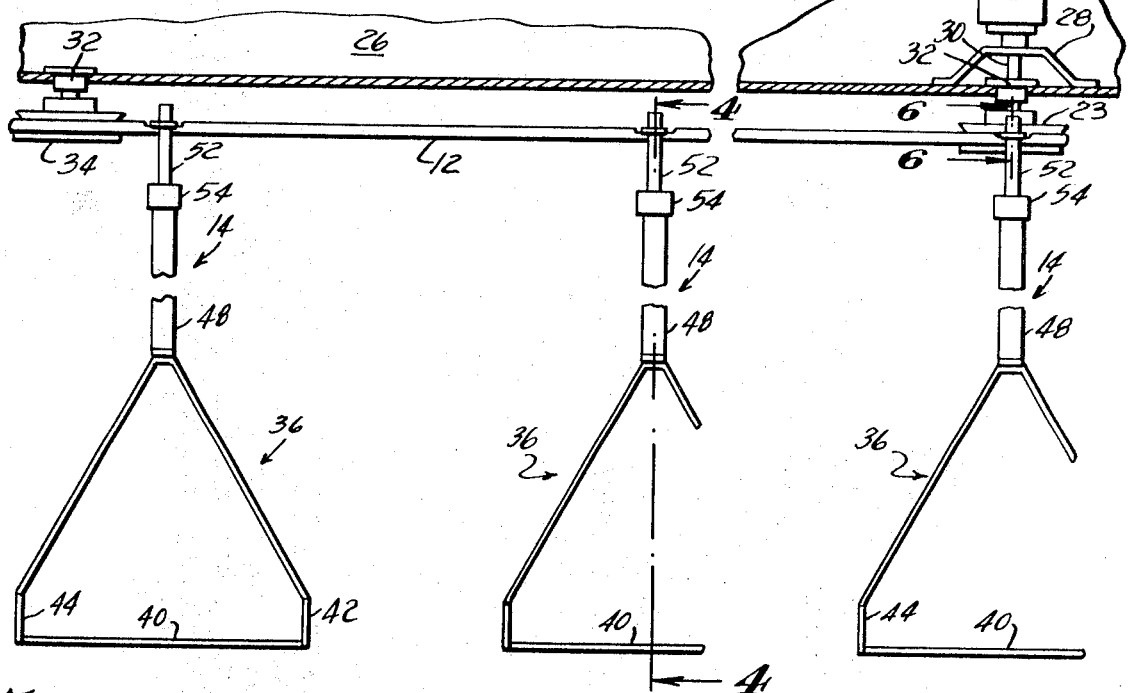
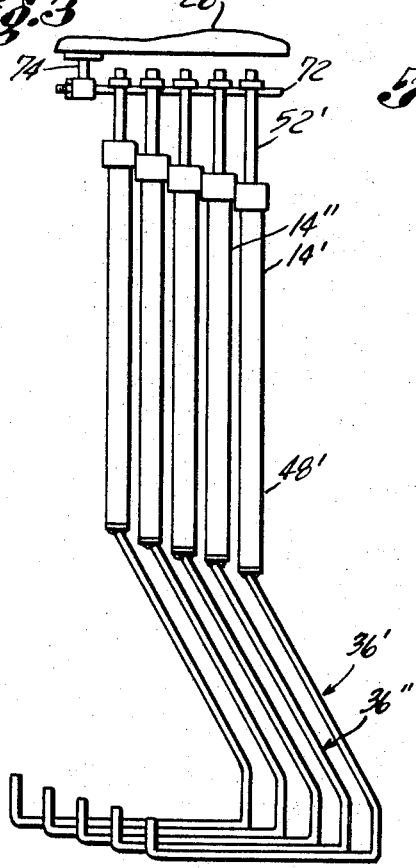
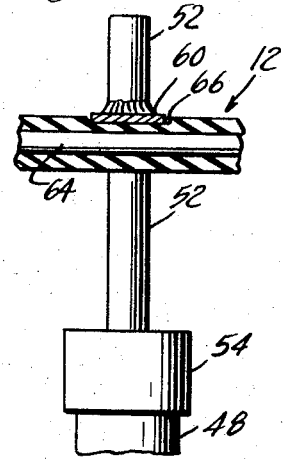
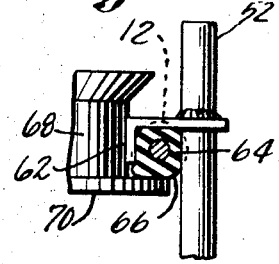
Jacob A. Rust
INVENTOR.
BY Roger L. Martin
Attorney United States Patent Office 3,615,003
Patented Oct. 26, 1971

3,615,003
FOOD CONVEYOR SYSTEM FOR A VEHICLE
Jacob A. Rust, 1026 Alba Drive, Orlando, Fla. 32804
Filed May 1, 1969, Ser. No. 820,722
Int. Cl. B65g 17/20
U.S. Cl. 198—177 R
2 Claims

ABSTRACT OF THE DISCLOSURE

A conveyor system for delivering food trays to a passenger compartment in a passenger transporting vehicle. A plurality of carrier assemblies are removably mounted at spaced locations on a cable having an elastic covering which travels throughout the passenger compartment of the vehicle. Each carrier assembly includes a spring member providing a biasing support between a cable engaging portion and a tray engaging portion of the carrier assembly thereby allowing relative movement between these two portions of the carrier assembly so as to prohibit displacement of the tray and proper orientation of the carrier assembly regardless of the attitude or change in position of the vehicle.

BACKGROUND OF THE INVENTION

Field of invention

The present invention is directed to a conveyor system of the type used in high speed passenger transportation vehicles for delivery of trays of food or the like throughout the passenger compartment. The conveyor travels in a substantially continuous path wherein a plurality of tray carrier assemblies deliver individual food trays to designated areas within the passenger compartment. After use, the trays are again placed on the carrier for their return trip to a galley or kitchen area from the passenger compartment of the vehicle.

Description of prior art

The problem of individually delivering a plurality of food trays or the like to passengers in a high speed transportation vehicle such as an airplane is a long recognized problem in the transportation industry. The most customary way of delivering food trays or otherwise serving the passengers traveling in a high speed vehicle was through the use of one or more stewardesses individually hand carrying the passenger's food tray directly to each passenger. This method, while still the most commonly used among the commercial airlines, has its obvious disadvantages such as length of time needed to service all of the passengers along with the inconvenience and even dangerous practice of carrying the food trays up and down relatively narrow aisles in the vehicle.

In answer to this problem, a number of prior art conveyor systems have been suggested which obviously have not been satisfactory as evidenced by the fact that the most commonly used method of delivering the trays to passengers is still by hand carrying the tray as described above. In all of the prior art systems known to date, a number of serious problems have developed which eliminate them as a practical means of passenger service in the transportation industry. The known conveyor systems include such disadvantages as being unnecessarily awkward, cumbersome and heavy thereby placing an unnecessary burden on the stewardess or person delivering the trays to the passengers. In addition, all known conveyor systems necessitate a great deal of expensive and time consuming modification of the aircraft or other type vehicle in which the various systems are to be utilized. This is due to the numerous, complex and expensive parts which the prior art conveyor systems include. The maintenance requirements, spare parts, and logistics of these systems would require airlines or other transportation media to add and maintain a complete spare part inventory and repair personnel departments to insure the practical operability of these systems. Consequently, the use of these relatively complex prior art systems would necessitate various design changes in the vehicle cabin structure such as length and width of the aisle in the passenger compartment, overhead storage space, number of seats per row and number of rows. All of these design changes will, of course, be quite expensive and possibly impossible especially in aircraft vehicles wherein the structural design of the vehicle is critical.

An additional, and possibly most important reason for the failure of prior art conveyor systems, is their failure to render safe and efficient service in delivering the individual trays or portions to the passenger compartment. While great strides have been made in the airline industry, in the field of providing comfortable and smooth rides to the passengers, it is generally well known that a great number of flights encounter, to some degree, a portion of the trip which is less than perfectly smooth. As a result, during almost every flight, there occurs a time when the attitude or orientation of the aircraft changes either abruptly or gradually to a sufficient degree which would allow for a spilling of food from the trays or the dislodging of trays from carriers, if proper measures were not taken to orient the food trays relative to the position or attitude of the aircraft. A majority of the prior art systems fail in this point in that the trays or food carriers are substantially rigidly connected to the delivery conveyor itself such that even a relatively small change in the attitude of the aircraft results in a spilling of the contents of the food trays.

SUMMARY OF THE INVENTION

The present invention is directed to a food conveyor system designed to be adapted to high speed passenger transportation vehicles such as an aircraft. The conveyor system comprises a plurality of food tray carrier assemblies which are removably mounted on a conveyor cable capable of traveling an endless path throughout the passenger compartment. Each of the carrier assemblies includes a biasing mechanism which allows the portion of the carrier assembly supporting the food tray to be displaced or movable relative to the portion of the carrier assembly in supporting contact with the conveyor cable. The biasing mechanism includes a simple coil spring having a predetermined biasing force sufficient to provide a dampening or shock absorbing function which serves to absorb any force which would ordinarily be communicated to the food tray due to a substantial or sudden change in the attitude of the aircraft or vehicle. Each of the carrier assemblies is attached to a cable having a sheath of resiliently deformable material which insures, by means of a cable engaging bracket component of the carrier assembly, a secure yet removable means of mounting each carrier assembly onto the cable. Consequently, through the combination of the mounting arrangement and the biasing mechanism, each carrier assembly will maintain a proper substantially upright orientation regardless of the attitude or position of the vehicle.

An additional feature of the subject conveyor system is the provision of storage facilities which include a storage rack on which a plurality of the carrier assemblies are designed to be stacked in a side-by-side nested fashion. This is accomplished again due to the structural arrangement of the biasing mechanism which allows each tray engaging portion of each carrier assembly to be displaced a relatively greater distance from the storage rod in order to fit underneath of the tray engaging portion of the prior adjacent carrier assembly.

The conveyor system of the present invention has the additional advantage of low installation and maintenance costs in requiring only slight modification of the vehicle interior when the system is installed. The conveyor system itself is extremely simple in design and operation in that the conveyor may travel in a continuous path defined by the cable traveling about at least two pulleys each arranged at opposite ends of the interior portion of the vehicle being serviced. Of course, additional support means, which may or may not be in the form of pulleys, may be provided along the conveyor path if the weight of the individual carrier trays become too great. Power to move the conveyor cable is provided at one of the pulleys at one end of the conveyor by means of a motor.

Consequently, it can be seen that the present system removes all of the major problems prevalent in other food conveyor systems of this type, in that the present system does not involve the use of complex, expensive or highly maintainable parts. In addition, installation costs and necessary revisions to the aircraft or vehicle interior are eliminated and the single drive system of the subject conveyor eliminates extensive modification of the aircraft that is necessary with prior art conveyor systems. Finally, one of the most important problems, that of efficient and safe use during operation, is accomplished in that the dislodging of the food trays from the system due to a change in the aircraft attitude is eliminated because of the structural arrangement of the individual food tray carrier assemblies as described above.

BRIEF DESCRIPTION OF THE DRAWINGS

FIG. 1 shows the subject conveyor system adapted to the interior of a vehicle.

FIG. 2 is a modified side view of the subject conveyor system.

FIG. 3 is a side view of the storage facility of the present invention.

FIG. 4 is a side view of the carrier assembly of the subject invention.

FIG. 5 is a sectional view taken along the lines 5—5 of FIG. 4.

FIG. 6 is a sectional view taken along the lines 6—6 of FIG. 2, and

FIG. 7 is a perspective view of the carrier assembly which forms part of the present invention.

DETAILED DESCRIPTION OF THE INVENTION

FIG. 1 discloses the subject invention installed in a passenger vehicle such as an aircraft or the like. The interior of the passenger compartment 10 of the vehicle may include a central aisle lined along each side with passenger seats. Generally, the present conveyor system includes an endless driven conveyor cable 12 with a plurality of food tray carrier assemblies 14 removably suspended therefrom. Each of the carrier assemblies 14 is designed to carry a food tray 16 along an endless path for movement of the trays between the passenger compartment 10 and galley area 19 in the vehicle. The carrier assemblies 14 transport the trays 16 into and out of the galley or kitchen area 19 through a pair of open windows 18 and 20 which are mounted in a partition 22 separating the kitchen area from the passenger compartment 10.

The cable mounting or support arrangement comprises at least one driven pulley 23 arranged at one end of the conveyor in direct driving contact with the cable 12. Pulley 23 is driven, and thus also the cable 12 by a motor means 24 mounted on the vehicle body 26 by means of bracket 28. A drive shaft 30 of motor 28 is supported by means of a bearing mount 32 so as to extend through mount 32 into direct driving contact with the pulley 23. The cable mounting arrangement for the conveyor system also includes at least one freely rotatable support pulley 34 attached to the vehicle body 26 by means of a second bearing mount 32. Of course, support pulley 34 may take the form of any suitable support means other than a pulley which is capable of having the cable and carrier assemblies travel thereon. If required, due to the weight of the carrier assemblies 14 mounted on the cable 12, a number of other support means, which may or may not take the form of pulleys, may be mounted along the path of the conveyor to supply additional support to the cable.

The structure of one of the carrier assemblies 14 is disclosed in FIGS. 4 and 7 and it includes a tray supporting portion 36, a cable engaging bracket member 58 which is located above the tray support 36, and an elongated biasing mechanism 90 which is secured at its opposite ends 91 and 92 to the bracket 58 and tray support portion 36 respectively for permitting relative movement of member 58 and the tray support 36 along the longitudinal axis of the mechanism 90. The tray support 36 is structurally formed from bent bars or rods and the base of support 36 includes generally horizontal arms 38 that are joined at one end by a crossbar 40 having upstanding fingers 42 and 44 for retaining the food tray 16 securely on the base arms 38. The tray supporting portion 36 of the carrier is attached by angled arms 45 at joint 46 to the bottom of a spring housing component 48 of the biasing mechanism 90. Spring housing 48 is a hollow cylindrical chamber which houses a coil spring member 50 of mechanism 90. A main support rod member 52 of the mechanism 90 extends through a sealing cap 54 and into housing 48 where it is arranged in coaxial relationship with the spring member 50. The lower end of spring 50 engages a disc 56 integrally attached to support rod 52, while the upper end of spring 50 engages the sealing cap 54 which is securely attached to housing 48. This structural arrangement of mechanism 90 permits relative movement of the tray supporting portion 36 and cable engaging member 58 along the longitudinal axis of the mechanism. The cable engaging member 58 is in the form of a hoop forming substantially L-shaped angled bracket that has horizontal and vertical arms 60 and 62 respectively.

As best seen in FIGS. 5 and 6, the cable 12 includes a center or core portion 64 which is surrounded by a resiliently deformable sheath or outer covering 66. The depending arm 62 of the hook forming bracket is spaced apart from the upper end 91 of the rod component 52 of mechanism 90 by a distance less than the outer diameter of the sheath. As such, when the hook forming bracket engages the cable 12, the sheath or core covering 66 is deformed and compressed between the rod end 91 and bracket arm 62. This arrangement provides direct frictional contact between the sheath and bracket and thus assurance against sliding movement of the carrier on the cable 12 or the carriers dislodgement from the cable 12 during a sudden or abrupt change in the position of the vehicle while the yieldable nature of the covering provides a flexible connection that permits the carrier to remain upright during attitude changes in the vehicle. The elastic covering 66 also allows the bracket member 58 to travel along with the cable 12 as it passes around pulleys 23 or 34. FIG. 6, shows that each of the pulleys 23 or 34 designed to include a pulley base 68 which engages the offset arm 62 of bracket 58 and the cable 12 as the bracket traverses the pulley. The pulleys, as seen in FIG. 2, have a generally vertical axis of rotation, and each has a lower flange 70 that underlies and supports the portion of the cable engaging the pulley in the arrangement. Accordingly, as the bracket 12 traverses the pulley, arm 62 is interposed between the base 68 of the pulley and the cable sheath 66 at a point located above the cable supporting flange.

The conveyor system of the subject invention further includes storing facilities wherein the various carrier assemblies are stored in nested fashion due to the structural arrangement of the support biasing means which, as described above, may take the form of a coil spring 50. The storage facilities include a storage bar or rod 72 mounted by bracket 74 to the vehicle 26. It should be noted that storage of the carrier assemblies 14 could be provided on cable 12 instead of bar 72. If a storage area were provided on cable 12, mounting member 74 would have to be structurally capable of allowing cable 12 to travel through it, in addition to properly supporting the cable 12 so as to hold a plurality of closely arranged nested carrier assemblies.

As shown in FIG. 3, the carrier assemblies may be arranged in a nested fashion by lowering the tray engaging portion 36' and housing 48' on the last carrier assembly 14' relative to its associated support rod 52' such that the tray engaging portion 36" of the prior adjacent carrier assembly 14" in a nested fashion. Successively adjacent carrier assemblies are arranged in a similar manner by causing a greater degree of compression of the coil spring 50 and therefore a greater displacement of a tray engaging member 36 relative to its associated support rod 52 which thereby allows the tray engaging portion 36 of the last carrier assembly in the nested stack to fit underneath the prior adjacent tray engaging portion of the prior adjacent carrier assembly.

In operation, the food conveyor system of the present invention, as clearly disclosed in FIG. 1, provides an endless conveyor path defined by cable 12. A plurality of food tray carrier assemblies 14 are arranged at predetermined spaced intervals along the cable so as to deliver the food trays 16 to the desired passenger locations. The trays and carrier assemblies pass first through a window 18 as they enter into the passenger compartment. Starting and stopping of the cable may be controlled by regulation of the motor 24 by remote control from any desired location in the interior of the vehicle. The conveyor system would position loaded food trays throughout the entire passenger compartment so as to deliver the trays to both rows of seats on either side of the aisle. A stewardess or other personnel would then remove the individual trays from the carrier assemblies and place them in the possession of the passengers. The trays would later be removed by placing the trays again on the individual carrier assemblies which would remove them from the passenger compartment through window 20 into the galley or disposal area. During the period when the food trays are in use by the passengers, the carrier assemblies could remain on the cables within the passenger compartment or all carrier assemblies could be removed from the compartment by simply passing all the empty carrier assemblies through window 20. If this was done, upon removal of the food tray, the empty carrier assemblies would then file from window 18 throughout the passenger compartment, the conveyor system would be stopped, a stewardess would load all the food trays 16 onto the individual carrier assemblies 14 and the conveyor system would then be started to file all of the loaded carrier assemblies 14 out through window 20 to the disposal area.

If during the period when the food trays 16 were being delivered or removed from the passenger compartment, there was a sudden unexpected change in the attitude of the airplane, the hook-like carrier assemblies 14 would be maintained in proper orientation in a relatively upright position regardless of the attitude or position of the aircraft. This is accomplished by the flexible cooperating engagement between bracket 58 and elastic covering 66. Consequently, the carrier assemblies 14 are free to find a proper vertical orientation on cable 12 in that they are not rigidly mounted to the traveling conveyor as in the prior art systems. Similarly, any excess force which would eventually be transferred to the food tray would be dampened or absorbed by the biasing mechanism comprising shock absorbing spring 50 which has a predetermined biasing force sufficient to dampen any excess force. This combination of a flexible mounting arrangement along with a biasing support means would clearly prevent the dislodging of any tray from the carrier assemblies 14 or the spilling of any food from the food tray 16.

When the system is not in use, the individual carrier assemblies 14 are simply removed from the cable 12 and placed on a storage rod 72 (FIG. 3) wherein the first tray assembly hangs normally and the second and each successive carrier assembly are stacked in a nested fashion as described above. The storage of these individual carrier assemblies may be accomplished in a much smaller area in this nested fashion due to the extremely efficient and advantageous biasing spring 50 which is clearly outlined above.

What is claimed is:

1. The combination with a vehicle having an internal passenger compartment and a galley area of a food tray conveyor system which comprises an endless cable mounted in the vehicle and defining an endless path for movement of food trays between the passenger compartment and galley area, cable driving means for moving said cable along said path, and a plurality of tray carrier assemblies which are individually removably suspended from the cable; each of said carrier assemblies including cable engaging means engaging said cable, a food tray supporting portion below said cable engaging means, and an elongated biasing mechanism permitting relative longitudinally axial biased movement of said cable engaging means and said tray engaging portion; said mechanism having opposite ends respectively secured to said cable engaging means and said tray supporting portion, and including spring means located between said opposite ends for dampening vehicle movements imparted to said tray supporting portion through said cable, a housing for said spring means which is secured to said tray engaging portion, and a rod member which is secured to said cable engaging means and is connected with the spring means within said housing.

2. The combination with a vehicle having an internal passenger compartment and a galley area of a food tray conveyor system which comprises an endless cable mounted in the vehicle and defining an endless path for movement of food trays between the passenger compartment and galley area, cable driving means for moving said cable along said path, and a plurality of tray carrier assemblies which are individually removably suspended from the cable; each of said carrier assemblies including cable engaging means engaging said cable, a food tray supporting portion below said cable engaging means, and an elongated biasing mechanism permitting relative longitudinally axial biased movement of said cable engaging means and said tray engaging portion; said mechanism having opposite ends respectively secured to said cable engaging means and said tray supporting portion, and including spring means located between said opposite ends for dampening vehicle movements imparted to said tray supporting portion through said cable; said cable having a resilient outer covering that is deformed by engagement by said cable engaging means, and said carrier assemblies being secured against movement along the cable by direct frictional contact between said cable engaging means and said covering; said cable driving means including a pulley engaged by said cable and having a generally vertical axis of rotation and a cable supporting flange that underlies the cable portion engaging the pulley, and said cable engaging means comprising an arm which is located above the flange and interposed between the pulley and cable as the cable engaging means traverses the pulley during movement of said cable along said path.

References Cited

UNITED STATES PATENTS

| 1,922,141 | 8/1933 | Smith | 198—130 |
|---|---|---|---|
| 2,456,224 | 12/1948 | Sullivan | 198—177 |

RICHARD E. AEGERTER, Primary Examiner

D. D. WATTS, Assistant Examiner

U.S. Cl. X.R.

186—1 R